United States Patent [19]
Landrum et al.

[11] 3,812,243
[45] May 21, 1974

[54] COMBINED PROCESS FOR RECOVERING S FROM $H_2S$ IN CLAUS PLANT AND TREATING TAILGAS TO REMOVE $H_2S$ AND $SO_2$

[75] Inventors: Leslie H. Landrum, Kansas City, Mo.; Robert L. Huppe, Shawnee Mission, Kans.

[73] Assignee: J. F. Pritchard and Company, Kansas City, Mo.

[22] Filed: Apr. 13, 1972

[21] Appl. No.: 243,660

Related U.S. Application Data

[63] Continuation-in-part of Ser. No. 44,790, June 6, 1970, abandoned.

[52] U.S. Cl. .................................................. 423/574
[51] Int. Cl. .................................................. C01b 17/04
[58] Field of Search ............ 423/573, 574, 576, 222

[56] References Cited
UNITED STATES PATENTS

| | | | |
|---|---|---|---|
| 2,413,714 | 1/1947 | Keeling .............................. | 423/574 |
| 2,834,655 | 5/1968 | Chute et al. ...................... | 423/574 X |
| 3,459,495 | 8/1969 | Iida et al. ......................... | 423/573 X |
| 3,035,889 | 5/1962 | Nicklin et al. .................... | 423/573 X |
| 3,097,926 | 7/1963 | Nicklin et al. .................... | 423/573 |
| 2,389,810 | 11/1945 | Odell et al. ....................... | 423/574 |

FOREIGN PATENTS OR APPLICATIONS

| | | | |
|---|---|---|---|
| 797,739 | 10/1968 | Canada .............................. | 423/574 |
| 1,151,316 | 5/1969 | Great Britain | |

*Primary Examiner*—G. O. Peters
*Attorney, Agent, or Firm*—Schmidt, Johnson, Hovey & Williams

[57] ABSTRACT

Discharge of sulfur compounds into the air in the tailgas from a Claus plant is substantially eliminated by first burning the acid gas delivered thereto with less than an amount of oxygen required to oxidize one-third of the $H_2S$ supplied so that the ratio of $H_2S$ to $SO_2$ in the hot tailgas is greater than normal and preferably of the order of about 4:1 up to about 10:1. The hot tailgas is next quenched with water to lower the underflow from the quench up to about 130° F. or lower thereby condensing sulfur to solid form and water vapor to liquid thus producing a gaseous effluent substantially devoid of $SO_2$ since the excess of $H_2S$ with respect to $SO_2$ in the tailgas drives the reaction therebetween to substantial completion. Sulfur in solid form is recovered from the underflow effluent while the overhead quench effluent is treated with a regenerable quinone absorption agent to remove residual sulfur compounds therefrom. Sulfur is removed from the absorption agent in conjunction with regeneration thereof and then combined with the sulfur removed from the water quench underflow.

8 Claims, 1 Drawing Figure

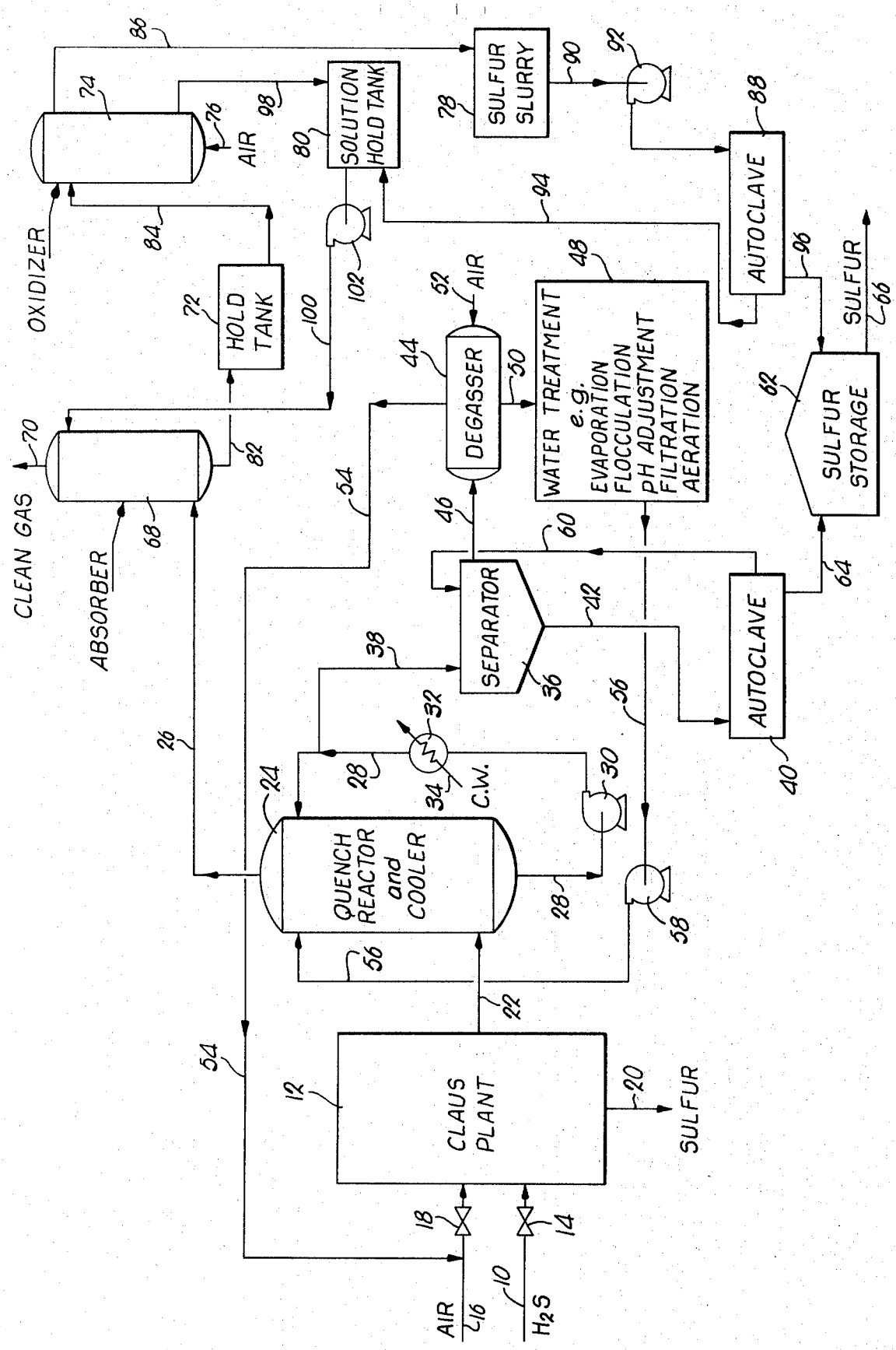

COMBINED PROCESS FOR RECOVERING S FROM $H_2S$ IN CLAUS PLANT AND TREATING TAILGAS TO REMOVE $H_2S$ AND $SO_2$

CROSS REFERENCE

This application is a continuation in part of our co-pending application, Ser. No. 44790, filed June 6, 1970 under the same title now abandoned.

This invention relates to an improved process for recovering sulfur from an acid gas containing $H_2S$ employing a Claus plant for effecting primary sulfur recovery wherein the acid gas delivered to the Claus plant is burned with less than one third of the amount of oxygen required to oxidize the $H_2S$ supplied to increase the ratio of $H_2S$ to $SO_2$ in the tailgas, followed by treatment of such tailgas with an absorption-oxidation agent to permit recovery of elemental sulfur therefrom and thus preclude discharge of significant amounts of sulfur bearing compounds into the atmosphere.

It has long been recognized that the Claus process for recovering sulfur from acid gases is advantageous from many aspects ranging from the high recovery efficiency of the Claus type plant, to the economic justification of the cost of the facility as compared with the value of the salable sulfur output therefrom. The conventional Claus plant embodies a series of sulfur conversion and condensation steps. After each condensation step the vapors must be reheated before entering a conversion step to prevent the condensation of sulfur in the treatment zone. Thus, the optimum number of conversion steps is controlled by the economic balance between investment and recovery. Two discrete steps are involved in converting the hydrogen sulfide to sulfur. First, one-third of the hydrogen sulfide is oxidized to sulfur dioxide and water in acid gas combustion structure at the inlet of the Claus plant in accordance with the reaction:

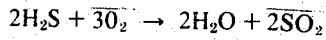

A shift reaction then occurs between the sulfur dioxide and the remaining hydrogen sulfide:

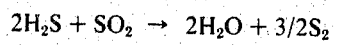

This shift reaction takes place in the high temperature reaction chamber and the lower temperature catalytic converters. Minor amounts of other sulfur bearing compounds are also formed in the reactions above, as for example carbon disulfide and carbonyl sulfide.

As noted, the efficiency of the sulfur recovery in a Claus plant is for the most part dependent upon the number of catalytic conversion units provided in the processing train and recovery values in the range of 96 percent are readily obtainable at a practical plant cost. In these processes, the acid gas is burned with at least that amount of oxygen made available to assure that one-third of the $H_2S$ is converted to $SO_2$. Air is generally used as the source of oxygen and frequently, automatic air control devices are used to assure that the right amount of air is always available for combustion with the acid gas. In a typical Claus plant where an amount of oxygen is made available for combustion with one-third of the $H_2S$ inlet gas, at least about 1½ – 2½ percent of $SO_2$ is discharged into the atmosphere in the tailgas.

As the size and concentration of sulfur recovery plants has increased, the necessity of limiting the discharge of sulfur compounds and particularly $SO_2$ into the atmosphere has assumed critical significance, especially in relatively highly populated areas. Efforts heretofore made to prevent discharge of noxious amount of $SO_2$ into the atmosphere from a Claus plant have not been either a technical answer to the problem or an attractive procedure from an economic standpoint.

It is, therefore, the primary object of the present invention to provide a modified Claus plant which is operable in a manner to substantially eliminate the discharge of noxious sulfur compounds into the atmosphere in the tailgas from the sulfur recovery process. This goal is accomplished by burning the $H_2S$ with less than one-third of the amount of oxygen required to oxidize the $H_2S$ supplied so as to increase the ratio of $H_2S$ to $SO_2$ in the hot tailgas from the Claus patent but without significantly lowering the sulfur recovery efficiency of the plant followed by quenching of the tailgas with water to condense gaseous sulfur and water vapor therein while at the same time effecting reaction of substantially all of the $SO_2$ in the tailgas with $H_2S$ present therein so that the tailgas discharge into the atmosphere can be virtually freed of sulfur bearing compounds (in this case primarily $H_2S$) by passing the gas through a regenerable quinone absorption medium of the type permitting ready recovery of elemental sulfur therefrom. Thus, since the sulfur condensed from the quench step as well as that recovered from the absorption operation are sent to the plant output, there is virtually no loss of salable product by cleanup of the tailgas.

Another important object of the invention is to provide a process for preventing discharge of significant amounts of sulfur compounds into the atmosphere in the tailgas from a Claus plant wherein the water used to quench the hot tailgas from the Claus process is treated to not only remove sulfur compounds therefrom but also the heat load imparted to the same during quench so that such water may be reused in the process and minimizing the cost of operation of the overall method and equipment for carrying the same out.

A still further important object of the invention is to provide an efficient and economically practical method of preventing discharge of noxious sulfur compounds into the atmosphere in the gaseous effluent from a Claus plant wherein sulfur dioxide is virtually eliminated in the method while $H_2S$ is absorbed into a regenerable quinone composition such as an aqueous alkaline salt of anthraquinone disulfonic acid or a naphthaquinone sulfonic acid which are especially suitable for regeneration with recovery of elemental sulfur therefrom utilizing air as the regeneration medium thus permitting operation of the overall facility at a minimum of cost with a maximum recovery of sulfur.

Another important object of the invention is to provide a process for recovering sulfur from $H_2S$ in a Claus plant involving treatment of the tailgas to remove $H_2S$ and $SO_2$ therefrom wherein readily available operating equipment may be combined in a novel arrangement to carry out the process of this invention under operating conditions which require variation only in relationship to the composition and rate of supply of the acid gas to be treated in the Claus plant.

Other objects and important features of the present invention will be described or become apparent in the detailed description which follows.

The drawing is an essentially schematic representation of an improved process embodying the preferred concepts of the present invention and illustrating a conventional Claus sulfur recovery plant along with equipment associated therewith for substantially eliminating the discharge of noxious sulfur compounds into the atmosphere in the tailgas from the acid gas treatment facility.

In the preferred embodiment of the invention illustrated schematically in the single drawing, acid gas consisting primarily of $H_2S$ is directed via line 10 into the burner section of a conventional Claus plant broadly designated 12. Valve 14 in line 10 permits selective variation of the flow rate of the acid gas to the burners. Generally, the acid gas is a by-product of a natural gas treatment operation wherein $H_2S$ is removed from the natural gas by an absorption process and then the absorbers are regenerated to remove the $H_2S$ therefrom.

The acid gas is burned with oxygen in the inlet section of plant 12 and air for that purpose is supplied through line 16 having a control valve 18 therein. As will be explained in detail hereinafter, valve 18 is controlled so that the amount of air supplied to the burners of plant 12 is less than the amount of oxygen required for combustion with one-third of the $H_2S$ delivered for combustion. Preferably, the amount of oxygen made available for combustion with the $H_2S$ is within the range of about 90 percent up to slightly less than that required for combustion with one-third of the acid gas delivered to the Claus patent. Although not illustrated in detail in the drawing, it is to be understood that the Claus plant 12 has conventional treatment equipment therein including one or more burners which are normally combined with a reaction chamber, a waste heat boiler associated with the primary reaction chamber, and one or more catalytic converters each in turn followed by a sulfur condenser. Liquid sulfur from the waste heat boiler as well as the condensers following the catalytic converters comprises underflow from plant 12 which exits therefrom via line 20. The hot tailgas containing hydrogen sulfide, sulfur dioxide, gaseous elemental sulfur, water vapor, and minor amounts of carbon disulfide and carbonyl sulfide along with some carbon dioxide is removed from the plant through line 22 at a temperature which typically will be about 260° – 270° F.

It has been discovered that by operating the Claus plant with an air supply as defined above which is less than the amount required to burn one-third of the $H_2S$, supplied for combustion and regulated so that the ratio of $H_2S$ to $SO_2$ in the tailgas overhead leaving plant 12 through line 22 is of the order of somewhat greater than 2:1, preferably about 4:1 and up to 10:1 the tailgas can be quenched with water to a temperature where condensation of the gaseous elemental sulfur takes place in conjunction with further reaction of $H_2S$ and $SO_2$ to a point where virtually all of the $SO_2$ in the tailgas undergoes reaction with the hydrogen sulfide and the sulfur thus produced is recovered, so that the $H_2S$ remaining in the gaseous effluent from the quench step may be readily removed from the final gaseous discharge from the treatment facility by the absorption thereof in a readily regenerable composition such as salts of anthraquinone disulfonic acid or naphthaquinone sulfonic acid. Reuse of the quench water is made possible by treating the water after use to remove sulfur compounds therefrom followed by removal of the quench heat load utilizing a cooling tower or indirect heat exchange.

In order to accomplish the functions broadly referred to above, the hot tailgas exiting from plant 12 via line 22 is directed into the lower part of a combination cooler and quench reactor vessel 24. A gaseous overhead discharge line 26 extends from the top of vessel 24 while a liquid and solids underflow line 28 having a circulating pump 30 therein extends from the bottom of vessel 24 back to the top portion thereof. Cold water, preferably at a temperature at least as low as 95° – 100° F. supplied via line 34 is brought into indirect heat exchange relationship with the circulating liquid and solids flowing through line 28 through the medium of heat exchanger 32.

About 10 percent of the liquid and solids flowing through line 28 are diverted therefrom downstream of heat exchanger 32 and directed into separator 36 via line 38. Separator 36, which for example may comprise a centrifugal or gravitational separation unit, serves to segregate the solid particulate sulfur from water slurry thereof with the solids removed being sent to continuous autoclave 40 through line 42 while separated water is directed to degasser 44 via line 46 before flowing into water treatment system 48 through the medium of line 50. Air introduced into degasser 44 through line 52 assists in removal of gas (primarily $H_2S$) from the water and the gas overhead line 54 leads back to the air line 16 for the burners of the Claus plant 12.

Water treatment system 48 is preferably operable to not only cool the water as by evaporation in a cooling tower but also is desirably constructed to effect removal of residual sulfur therein as by flocculation, pH adjustment or aeration as proves most effective alone or in combination. In this manner the water may be returned to quench reactor and cooler 24 via line 56 having a circulating pump 58 therein. Under preferred operating conditions the water is returned to quench reactor and cooler 24 at a temperature within the range of at least as low as 95° to 100° F. Alternatively, water from system 48 may be sent to waste. In any event, though, the temperature of the water returned to vessel 24 via lines 28 and 56 inclusive should be correlated with the respective rates of flow thereof to cause the liquid and solids underflow from vessel 24 to exit therefrom via line 28 at a temperature at least as low as about 130° F. and preferably of the order of 110° to 115° F. The temperature of such underflow should be sufficiently low to assure solidification of all sulfur present in the liquid and to condense water vapor which is thereby separated from the sulfur in particulate form by the separator 36 and autoclave 40 connected in series relationship. Lowering of the temperature of the underflow from vessel up to the specified low level also drives the reaction between $SO_2$ and $H_2S$ sufficiently to the right to assure reaction of virtually all, if not all, of the $SO_2$ leaving only $H_2S$ as a residual unreacted gas in the liquid and particulate sulfur slurry exiting from vessel 24. Water removed from the particulate sulfur in the continuous autoclave is returned to separator 36 via line 60. Solid sulfur from autoclave 40 passes to sulfur storage vessel 62 through line 64 and may be removed from storage via line 66.

The $H_2S$ removal solution hold tank 68 shown diagramatically on the right-hand side of the schematic drawing is adapted to contain a regenerable quinone solution capable of absorbing sulfur compounds and particularly hydrogen sulfide. The preferred hydrogen sulfide absorber comprises one or more salts of anthraquinone disulfonic acid (ADA), as for example as disclosed in U.S. Pat. No. 3,035,889, which is incorporated herein by reference. The anthraquinone disulfonic acid compositions described in this patent are particularly useful in that they may be regenerated by oxidation thereof with air. Although the alkaline ADA solutions described in the '889 patent have utility for absorbing $H_2S$ and permitting recovery of elemental sulfur therefrom, best results have been obtained using an additive in connection therewith such as sodium meta — vanadate ($NaVO_3$) by virtue of the fact that the vanadate compound improves the spread of conversion of hydrogen sulfide to sulfur and increases the hydrosulfide loading of the washing medium. The use of vanadium compounds such as ortho-, meta- and pyrovanadates of ammonia and alkali metals as regenerable $H_2S$ removing agents is detailed in U.S. Pat. No. 3,097,926 which is also incorporated herein by reference.

When ADA is used as the $H_2S$ removing agent, the overall reaction involves -

$$H_2S + \tfrac{1}{2} O_2 \rightarrow S + H_2O.$$

Since an alkaline solution of the ADA is employed, the process basically takes place in five stages:

1. Absorption of hydrogen sulfide in the alkali producing $HS_2$;
2. Reduction of the ADA by means of addition of $HS_2$ to a carbonyl group;
3. Liberation of S from the reduced ADA by interaction with $O_2$ dissolved in the water;
4. Reoxidation of the reduced ADA; and
5. Reoxidation of the alkaline solution providing dissolved oxygen in the solution for stage 3 of the process.

The process is normally operated in the pH range of about 8.5 to 9.5 and preferably within the range of 8.8 to 9.1 with effort being made to keep the pH as close to 9 as practicable. Within this pH range, absorption of $H_2S$ results in $HS_2$ formation rather than sulfide ions which is a necessary condition of the process. The required pH is preferably obtained by using sodium carbonate and sodium bicarbonate in the ratio of 1:3, but ammonium salts of other alkaline salts may also be used. The commercial mixture of anthraquinone disulfonic acid (sodium salts) primarily consists of the 2:6 - and 2:7 - isomers. It is equally possible to use other ADA isomer salts, notably a mixture of anthraquinone 1:5 - and 1:8 - disulfonic acids (sodium salts), but availability and cost considerations normally dictate use of the 2:6 - and 2:7 - isomer mixture.

The process schematically illustrated in the drawing is especially useful for handling an ADA — sodium meta — vanadate $H_2S$ absorbing solution of the type used in a treatment system known commercially as the Stretford process and combining the teaching of the above-identified '889 and '926 patents.

In the Stretford process, the gas stream from quench reactor and cooler vessel 24 and containing $H_2S$ is directed via line 26 to an absorption column 68 containing a solution comprised of anthraquinone disulfonic acid (ADA), sodium meta vanadate, sodium potassium tartrate, soda ash, and generally a sequestering agent for tying up solubilized iron in the solution with ethylenediaminetetraacetic acid, or a compound of that general type being most useful for the purpose. The $H_2S$ is absorbed by the active Stretford solution described above and the clean gas stream either is discharged to the atmosphere via line 70 or recovered for other use. The outlet loading permissible depends on design and the amount of sulfur in the gas discharged to the atmosphere through line 70 can be as low as 0.2 p.p.m. The Stretford solution, after recirculation through the $H_2S$ absorber 68, is retained for 10 minutes in a hold area for completion of precipitation of sulfur. This hold-up can be at the bottom of the absorber vessel, or in a separate hold tank 72. From the hold tank area, the solution is pumped to an oxidizer vessel 74 where air from source line 76 is sparged upward through the solution.

The reactions involved in the Stretford process in simplified form may be represented as follows:

$$H_2S + Na_2 CO_3 \rightarrow NaHS + NaHCO_3$$

The sodium carbonate (soda ash) provides the alkaline solution for initial absorption of $H_2S$ and formation of hydrosulfide (HS).

$$HS^- + V(5^+) \rightarrow S\downarrow + V(4^+)$$

The sodium meta vanadate reacts with HS and is reduced from 5 valent to 4 valent to effect precipitation of elemental sulfur.

$$V(4^+) + ADA \rightarrow V(5^+) + \text{reduced ADA}$$

The anthraquinone disulfonic acid reacts with the 4 valent vanadium to convert it back to 5 valent and is itself reduced.

$$\text{Reduced ADA} + O_2 \rightarrow ADA + H_2O$$

Oxygen from the air is used to convert reduced ADA back to the oxidized state.

Thus the overall reaction is -

$$2H_2S + O_2 \rightarrow 2H_2O + 2S$$

Maintenance of the absorption solution in a holding area such as tank 72 after contact of the $H_2S$ containing gas with the Stretford solution minimizes the formation of thiosulfate, particularly when the absorption medium is maintained at a temperature below about 100° F.

The precipitated sulfur suspended in the Stretford solution is very finely divided and floats to the top of the oxidizer 74 during introduction of air into the used ADA - vanadate absorption medium and a sulfur froth forms containing usually from 6 percent to 8 percent sulfur at the top of the oxidizer. This froth is overflowed to a settling tank 78 where the sludge is accumulated while the underflow from the oxidizer is sent to the absorber solution hold 80 tank for recirculation to the $H_2S$ absorber 68.

In greater detail, gas containing $H_2S$ is supplied to $H_2S$ absorber vessel 68 via overhead supply line connected to vessel 68 adjacent the lower end thereof. A liquid underflow line 82 communicates the lower part of absorber vessel 68 directly with holding tank 72. Clean gas substantially free of $H_2S$ is discharged from the top of vessel 68 through line 70 while the outflow from tank 72 is directed via line 84 to oxidizer 74. Air is pumped into oxidizer 74 through air inlet line 76 for sparging of the solution in the oxidizer vessel by virtue of air discharge orifices in an internal distributor communicating with line 76. Air leaves oxidizer vessel 74 through the uppermost part thereof and is discharged to the atmosphere.

The sulfur slurry present at the top of oxidizer 74 and comprising a precipitated sulfur-aqueous absorber solution flows out of the upper portion of the vessel 74 into the agitator section of a sulfur slurry autoclave feed tank 78 via supply line 86. The top of tank 28 is open to the atmosphere. A mechanical agitator in tank 78 comprising for example a rotatable stirrer serves to continuously stir the mixture introduced into the tank and thereby effect removal of most of the air entrapped in the sulfur slurry and to effect thorough wetting of the particles of sulfur. The deaerated slurry overflows a weir within the main body of tank 80. The bottom of tank 78 is connected directly to tube inlet of an autoclave 88 comprising a tube and shell continuous sulfur melter heat exchanger via line 90 having a supply pump 92 therein. Steam is introduced into the shell of heat exchanger 88 while the outlet tube header of the exchanger 88 is joined to a sulfur liquid separator and line 94 directs liquid from the separator following the autoclave back to solution hold tank 80 while the sulfur output from the separator is directed to sulfur storage tank 62 via line 96.

The sulfur produced in oxidizer 74 is in finely divided form and floats to the top thereof for overflow into tank 78 via supply line 86. Underflow from oxidizer 74 is returned to $H_2S$ absorber solution hold tank 80 via line 98 for return to $H_2S$ absorber vessel 68 through line 100 having a circulating pump 102 therein.

A typical Stretford solution for use in absorber 68 may comprise, for example, 26.5 grams of sodium carbonate (soda ash), 2 to 5 grams per liter of anthraquinone disulfonic acid (preferably about 2.12 grams per liter of pure 2-7 isomer or 2.65 grams per liter of 80 percent 2-7 isomer), 0.8 grams per liter of sodium potassium tartrate (Rochelle salt), 1.08 grams per liter of ethylenediaminetetraacetic acid, and 1.52 grams per liter of 85 percent sodium meta vanadate. The above chemicals are dissolved in water to make up the $H_2S$ absorption solution.

The subject Stretford solution, after absorbing $H_2S$ from the gas admitted to vessel 68 via line 26, is preferably retained in hold tank 72 for a period of about ten minutes to allow for complete precipitation of sulfur. The underflow from hold tank 72 is directed to oxidizer 74 via line 84 where the used absorption composition is turbulently mixed with air to restore the chemical constituents in the Stretford solution to the original, active state in accordance with the reactions set forth hereinabove. In addition, the finely divided sulfur is forced to the top of the liquid where it is gathered in a froth containing 5 percent to 10 percent sulfur and overflowed via line 86 to the agitation section of autoclave feed tank 78 where the stirrer therein beats the slurry sufficiently to remove most of the entrapped air and to wet the particles of sulfur therein. The slurry which overflows the internal weir collects in the bottom of tank 78 which has a holding volume sufficiently large to permit the particles of sulfur to settle out in tank 78 so that the slurry at the bottom thereof will contain at least about 15 percent - 20 percent sulfur. Tank 78 should be large enough to assure a slurry holding time of from 30 minutes to at least about 12 hours with a 10 to 12 hour slurry retention time being most advantageous in that a maximum concentration of sulfur settles to the bottom of tank 78 and thus the size of autoclave 88 may be minimized. A centrifuge may be used in lieu of a large tank 78 if desired to effect concentration of the sulfur in the slurry to be processed in autoclave 88. However, the use of a relatively large tank 78 as a sulfur concentrating means has the additional advantage of providing a sulfur inventory to assure continuous feed for autoclave 88 in the event of an unexpected decrease of sulfur supply to tank 78, as for example if it is found necessary to shut down upstream equipment such as absorber 68 or oxidizer 74.

The sulfur Stretford solution slurry containing from about 15 percent to 20 percent sulfur by weight (preferably at least 20 percent), is pumped from tank 78 through line 90 directly into the continuous autoclave system 88.

The sulfur output from autoclave 88 is directed to sulfur storage tank 62 while the solution removed from the sulfur slurry is returned to solution hold tank 80 for redelivery to absorber 68.

In describing the operation of the equipment illustrated in the drawing, it can be assumed that Claus plant 12 is designed to produce 1,000 tons per day of sulfur from an acid gas consisting principally of $H_2S$. In a plant of this size, the sulfur output from line 66 will be approximately 55 tons per day with 27.5 tons per day of sulfur being removed in absorber 68 while the remaining 27.5 tons per day is separated from the gas introduced into cooler 24 by condensation therein followed by separation in the series connected separator 36 and autoclave 40. The amount of air permitted to mix with the $H_2S$ in the burner of the Claus plant is carefully controlled so that the oxygen available is within the range of about 90 percent to slightly less than that required for combustion with one-third of the $H_2S$ supplied in accordance with the following equation:

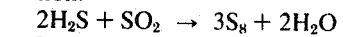

$2H_2S + SO_2 \rightarrow 3S_8 + 2H_2O$

In order for the process of this invention to be economically practical, it is necessary that the acid gas introduced into plant 12 via line 10 contain at least about 15 percent $H_2S$. Below that amount, the capital cost of the equipment and the operating expenses of the process do not make the method commercially attractive. In addition, the higher the percentage of $H_2S$ in the acid gas feed, the better the recovery and the more practical the system from both a cost and sulfur recovery standpoint. As the amount of air available for combustion with the $H_2S$ decreases, the $H_2S:SO_2$ molecular ratio increases with a ratio of 10:1 being reached when the amount of oxygen made available for combustion is about 90 percent of that required for stoichiometric combustion, of one-third of the $H_2S$ supplied to the Claus plant. It is to be understood though that the amount of air furnished should be as high as practical to prevent lowering of the yield of sulfur from the Claus plant to an impractical level but at the same time, the $H_2S:SO_2$ molecular ratio must be maintained sufficiently high to assure substantially complete reaction of $SO_2$ with $H_2S$ in the quench step to be hereinafter described in greater detail. Thus, a balance must be achieved between lowering the yield of the Claus plant to a minimum extent while at the same time assuring an excess of $H_2S$ to $SO_2$ so as to drive the reaction therebetween in a direction such that substantially all of the $SO_2$ in the tailgas from the Claus plant reacts with the $H_2S$ to leave substantially only $H_2S$ as a residual pollutant in the tailgas.

It has been found that when the concentration of $H_2S$ in the acid gas feed is about 75 percent, the yield of sulfur from the Claus plant 12 during operation thereof with air being furnished in at least that required for burning one-third of the $H_2S$ supplied is about 95 percent. Reduction of the air to supply only 95 percent of the theoretical oxygen required for conventional Claus combustion reduces the Claus plant sulfur yield only one-half percent to 94.5 percent. When the air is 90 percent of that necessary for conventional combustion, the sulfur recovery from the Claus plant is reduced by about only 1 percent to 94 percent.

Since reducing the air to 95 percent of that theoretically required for combustion of one-third of the $H_2S$ supplied lowers the sulfur yield from the Claus plant only about one-half, this amount of residual sulfur can readily be handled by the quench and Stretford $H_2S$ removal system. In these cases where it is economically justified to increase the sizes of the quench and absorption systems, the air supply can be lowered to 90 percent of that supplied for conventional acid gas burning without reducing the total sulfur output from the entire plant to an uneconomically low level.

Hydrogen sulfide and the very minor amounts of sulfur dioxide contained in the gas stream directed to absorber 68 are absorbed by the sodium salts of anthraquinone disulfonic acid-sodium meta-vanadate solution contained in absorber vessel 68 so that the overhead from the absorber comprises substantially clean gas leaving the treatment zone via discharge line 70.

The 27.5 tons per day of sulfur absorbed by the anthraquinone sodium meta-vanadate solution in absorber 68 is recovered from the spent solution which is subjected to an oxidation step in regeneration vessel 84 with a concentrated sulfur slurry being sent to holding tank 78 while the regenerated solution is returned to tank 80 via line 98. Air introduced into vessel 74 via line 76 serves as the oxidizing medium for the reduced ADA and is supplied in at least a stoichiometric quantity for oxidation of the anthraquinone solution in accordance with the simplified reactions set forth above.

Operation of the quench vessel 24 under conditions such that the underflow therefrom is at a temperature between about 130° F. and preferably of the order of 100°-110° F. initially produces a colloidal sulfur in the quench water. Continued operation of the system under – conditions specified results in a gradual formation of sulfur particles in the colloidal system of sufficient size that they are readily visible in a sample of the liquid and particulate sulfur system. These particles continue to grow in size with further operation of the quench procedure. After 4 to 6 hours of continuous operation, a proportion of the sulfur particles (those which have been recycled through the quench step for that period of time via line 28) and which are contained in 10 percent of the colloidal system withdrawn from the quench step via line 38, are amenable to separation from water in separator 36. Those which are still too small for centrifugal or gravitational separation are sent to water treatment system 48 and either removed at that point, or sent back to quench vessel 24 via line 56.

It is believed that the solidified sulfur produced by quenching the gas from Claus plant 12 at a temperature such that the quench effluent is at a level below 130° F. and preferably within the range of 100° to 110° F., results in the formation of particulate or granular sulfur of such nature that it lends itself to agglomeration or condensation within a sufficiently short period of time and at a rate to establish final equilibrium conditions wherein the sulfur separated by gravitation in separator 36 is in equilibrium with sulfur being introduced colloidally and as a consequence, the Claus plant may be operated at optimum off ratio air supply for sulfur production efficiency while at the same time permitting removal of virtually all of the sulfur constituents from the Claus gaseous effluent discharge by virtue of the fact that continued reaction between $SO_2$ and $H_2S$ in the quench step and production of a manageable sulfur product therefrom, means that a virtually $SO_2$-free gas can be introduced into the quinone absorption system as required and which inherently is at the optimum temperature levels demanded therefor; i.e. about 100° F.

In lieu of the ADA vanadate solution for absorption of $H_2S$ in the gaseous overhead from vessel 24, a solution containing a quinone such as 1,4-naphthaquinone, 2-sulfonate sodium in an alkaline medium which for example may be sodium carbonate, is an equally usable alternate. The hydrogen sulfide is believed to react with the sodium carbonate in the absorber 68 to form sodium bisulfide and sodium bicarbonate. The bisulfide is oxidized by the quinone to precipitate solid sulfur in finely divided form while the naphthaquinone sulfonate is reduced to naphthahydroquinone sulfonate. Upon pumping of the quinone and sulfur mixture to oxidizer 74, the naphthahydroquinone is oxidized by the oxygen in the air supplied through line 76, back to its naphthaquinone form for reuse. Sulfur is then removed from the regenerated quinone as previously described. Exemplary quinone compounds usable for cleanup of the $H_2S$ in the gaseous overhead from vessel 24 are disclosed in U.S. Pat. No. 3,459,495 which is incorporated herein by reference thereto.

Having thus described the invention, what is claimed as new and desired to be secured by Letters Patent is:

1. In a method of recovering sulfur from an acid gas containing $H_2S$ wherein the acid gas is subjected to a Claus type primary sulfur recovery process for burning the acid gas in the presence of oxygen to convert a part of the $H_2S$ to $SO_2$, followed by high temperature and catalytic shift of $SO_2$ and remaining $H_2S$ to produce gaseous elemental sulfur which may be recovered from the process upon condensation thereof and leaving a hot tailgas containing unreacted $H_2S$ and $SO_2$, uncondensed gaseous sulfur and compounds thereof, and water vapor, the improved process for limiting discharge of sulfur containing products into the atmosphere in said tailgas comprising:

limiting the amount of oxygen provided for combustion with the acid gas furnished to said Claus plant to a level of from about 90 percent to slightly less than that required for combustion with one-third of the $H_2S$ supplied and when correlated with the operating conditions of the Claus plant results in the ratio of $H_2S$ to $SO_2$ in the tailgas from the Claus plant to be from about 4:1 to 10:1;

quenching the hot tailgas discharge from said primary sulfur recovery process with sufficient cooling liquid to produce an underflow effluent from said quench at a temperature below about 130° F to effect solidification of a substantial part of any gaseous elemental sulfur and to condense water vapor contained therein as well as to effect solidification of elemental sulfur produced by further reaction of $H_2S$ in said tailgas;

contacting the gaseous constituents remaining from the preceding quench step with an aqueous alkaline absorption composition containing a quinone and characterized by the property of reacting with hydrogen sulfide or hydrosulfide produced by reaction of the $H_2S$ with the alkaline composition to produce elemental sulfur in conjunction with reduction of the composition to thereby produce a final tailgas which may be discharged into the atmosphere that is substantially free of sulfur bearing compounds; and subjecting the reduced absorption composition to an oxygen containing gas to effect regeneration thereof.

2. A process as set forth in claim 1 whereas is included the step of contacting the gaseous constituents remaining from said quench step with an aqueous alkaline solution of at least one salt of anthraquinone disulfonic acid.

3. A process as set forth in claim 1 wherein is included the step of contacting the gaseous constituents remaining from said quench step with an aqueous alkaline solution of at least one salt of anthraquinone disulfonic acid and a substance selected from the group consisting of ortho-, meta- and pyrovanadates of ammonia and alkali metals.

4. A process as set forth in claim 1 wherein is included the step of contacting the gaseous constituents remaining from said quench step with an aqueous alkaline solution of at least one salt of anthraquinone disulfonic acid and sodium metavanadate.

5. A process as set forth in claim 1 wherein is included the step of contacting the gaseous constituents remaining from said quench step with an aqueous alkaline solution containing 1,4-naphthaquinone, 2-sulfonate sodium.

6. A process as set forth in claim 1 wherein is included the steps of quenching the tailgas from said Claus plant with cooling water and treating the cooling water separated from the quench step underflow effluent to remove any $H_2S$, $SO_2$ and $S$ contained therein to permit reuse thereof as quench water for said tailgas.

7. A process as set forth in claim 6 wherein is included the step of passing the cooling water through an evaporative cooling zone prior to reuse thereof to remove at least a part of the heat load therefrom.

8. A process as set forth in claim 1 wherein is included the step of quenching the hot tailgas from the Claus plant with sufficient cooling liquid at a temperature to lower the underflow effluent therefrom to a temperature of about 100° – 110° F.

* * * * *